United States Patent [19]

Palmer

[11] Patent Number: 5,035,077
[45] Date of Patent: Jul. 30, 1991

[54] APPARATUS AND METHOD FOR IMPROVED PLANT GROWTH

[76] Inventor: Sharon-Joy Palmer, 1725 Brenda Rd., Rio Rancho, N. Mex. 87124

[21] Appl. No.: 401,666

[22] Filed: Aug. 31, 1989

[51] Int. Cl.⁵ ............................................. F24F 13/10
[52] U.S. Cl. ........................................ 47/17; 52/79.1
[58] Field of Search ................ 47/17; 52/20, 36, 107, 52/79.1

[56] References Cited

U.S. PATENT DOCUMENTS

| Re. 28,407 | 5/1975 | Kuhn et al. | 47/17 |
|---|---|---|---|
| 1,857,189 | 5/1932 | Gillespie | 52/36 |
| 2,639,551 | 5/1953 | McGee | 47/17 |
| 3,717,953 | 2/1973 | Kuhn et al. | 47/17 |
| 3,778,528 | 12/1973 | Heifetz et al. | 52/79.1 |
| 3,975,878 | 8/1976 | Modarelli, Jr. | 52/285 |
| 3,981,110 | 9/1976 | Le Cornec | 52/107 |
| 4,106,243 | 8/1978 | Horn | 52/79.1 |

FOREIGN PATENT DOCUMENTS

| 974972 | 11/1982 | U.S.S.R. | 47/17 |
|---|---|---|---|
| 2175334 | 11/1986 | United Kingdom | 52/20 |

Primary Examiner—Richard E. Chilcot, Jr.
Assistant Examiner—Joanne C. Downs
Attorney, Agent, or Firm—Arthur T. Fattibene; Paul A. Fattibene

[57] ABSTRACT

A modular self contained efficient horticulture growth chamber. Insulated panels form a sealed chamber having a grated sub-floor. An algae tank grows algae below the sub-floor. Trays are adjustably stacked and have mesh bottoms holding nutrient enriched gel. A broad spectrum light source is positioned on the south wall. A flow controlled irrigation misting system is timed in sequence with the light source. The chamber maintains a constant 68 to 78 degree Fahrenheit temperature with high humidity. Power is provided by a photovoltaic panel permitting installation in remote locations. The growth chamber and system provides high yields with little space and in locations not normally conducive to efficient growing.

9 Claims, 7 Drawing Sheets

APPARATUS AND METHOD FOR IMPROVED PLANT GROWTH

FIELD OF THE INVENTION

This invention relates generally to a horticulture growth chamber, and more particularly to a modular self contained efficient biosphere growing chamber and system.

BACKGROUND OF THE INVENTION

The concept of growing plants of various kinds in a horticulture chamber is well known. There are numerous examples of such chambers. For example, U.S. Pat. No. 3,458,951 issuing to Martin on Aug. 5, 1969 and entitled "Hydroculture Grass Unit."

These units are devices that aid in the growing of various plants. Each of these units contribute in some beneficial way to the production of plants, but none provide a modular self-contained unit requiring little maintenance while producing improved yields.

SUMMARY OF THE INVENTION

The present invention comprises a modular structure that is easily assembled and expanded. Rigid insulated panels are assembled to form a chamber. The chamber has a grated sub-floor, in one embodiment below which algae is grown. In a growing area are located adjustable seed racks capable of holding specially designed plastic trays. Within the trays is a biodegradable mesh covered by specially formulated nutrient gel. On the wall opposite the growing area, preferably on the south wall, are positioned special broad band fluorescent bulbs. An irrigation system is spaced around the chamber to provide a mist of water vapor for the plants in the growing area. The growing chamber is constructed to maintain a constant temperature between 68 and 78 degrees Fahrenheit with high humidity. A photovoltaic electrical system is used to supply power to the chamber. The entire chamber or unit is comprised of substantially all noncorrosive materials including fiberglass and plastic.

Accordingly, it is an object of the invention to provide a growth chamber having high yield in a small area.

It is another object of the invention to provide a chamber that is easy to assemble and build for multiple purposes.

It is yet another object of the invention to provide a chamber capable of growing food in remote locations.

It is still another object of the invention to provide a chamber that requires no external power.

It is still a further object of the invention to provide efficient plant growth with the least water possible.

It is yet a further object of the invention to provide a biologically pure controlled environment for plant growth.

It is yet a further object of the invention to provide an energy efficient chamber for growing plants.

It is yet a further object of the invention to provide a chamber having a substantially metal free environment.

These and other objects will become more readily apparent in view of the following more detailed description.

DETAILED DESCRIPTION OF THE PREFERRED EMBODIMENTS

Figure 1:
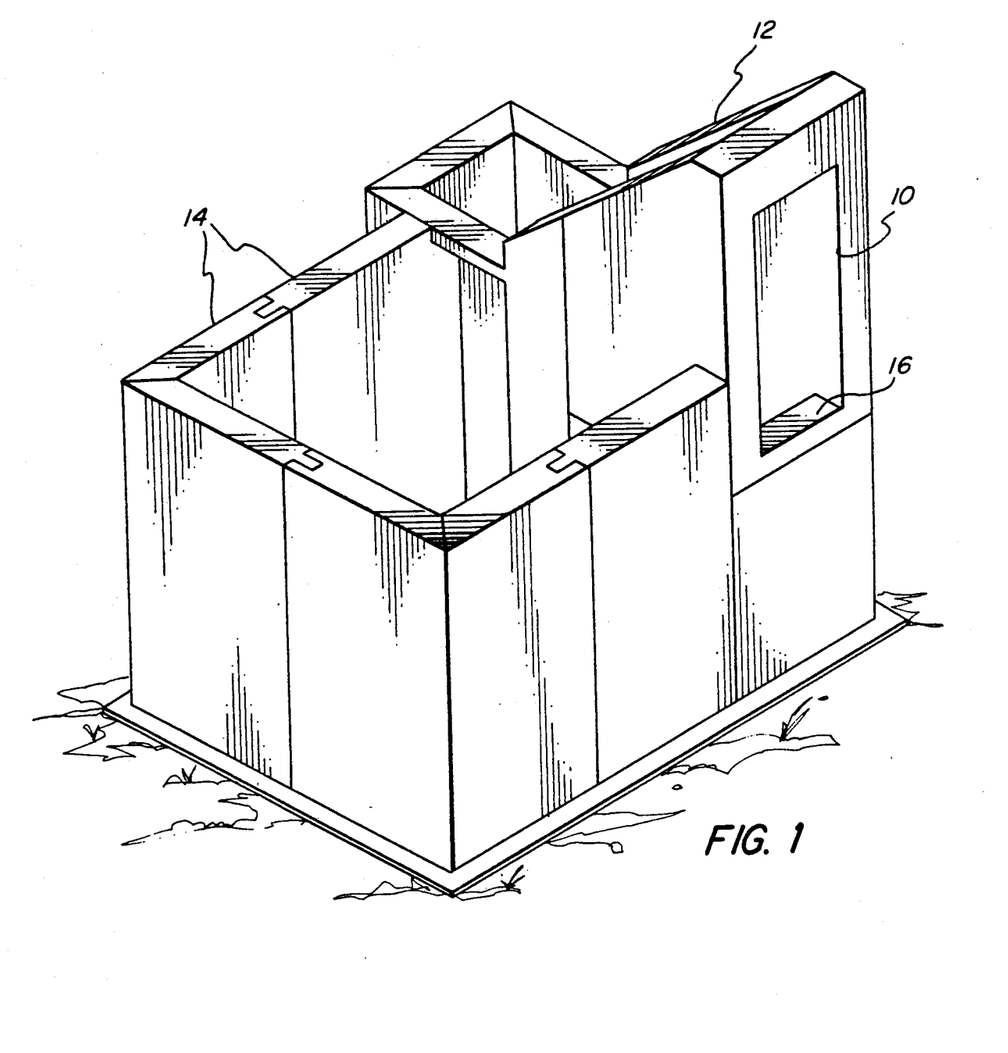
FIG. 1 is a perspective view of one embodiment of the invention.

FIG. 1 illustrates the modular or sectioned construction of the present invention. Panels 14 are made of a moisture resistant plastic. Panels 14 also have interlocking edges that are air and water tight. Additionally, the panels 14 incorporate three or six inch foam insulation. This helps to maintain a constant temperature inside despite fluctuations in outside temperature. This modular construction also permits the chamber or unit to be easily expanded. Either side of the modular unit can be expanded with the attachment of additional panels 14. These integrated foam core panels are unique in that they provide no batting or facing. They are fiberglass over foam panels that provide an air tight and water tight seal due to the tongue and groove construction. They are resistant to moist environments and are non corrosive. They are self sustaining and self supporting structural elements that are eighty percent lighter than steel. They can be expanded in all directions. The basic unit structure can be used not only for a growth chamber as in the preferred embodiment, but commercial, industrial, electronic, and housing purposes. In some applications the unit may need to be strapped down due to wind loads on such a light structure.

Figure 2:
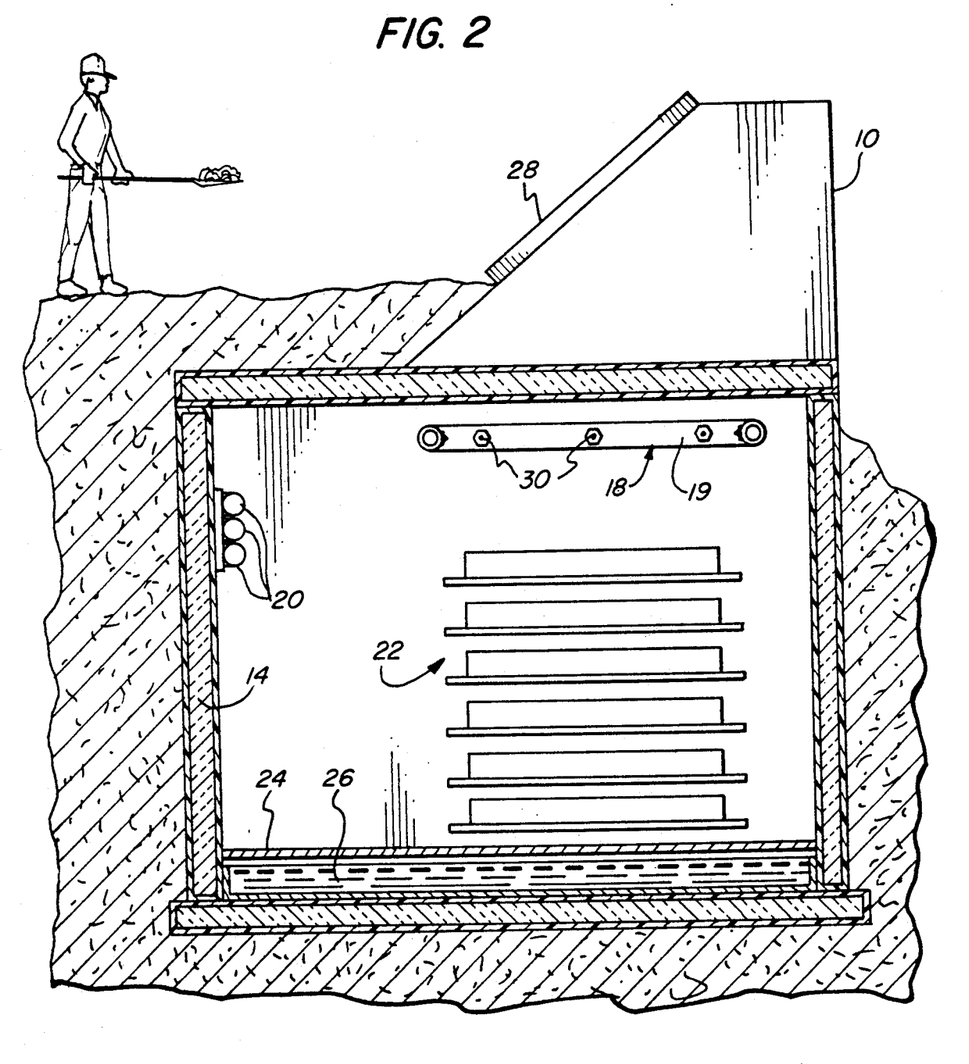
FIG. 2 is a cross section of one embodiment of the invention as installed underground.

The elevated doorway 10 permits the entire unit to be buried. Of course, the unit need not be buried, but to obtain maximum temperature stability within the unit it is preferred to bury the unit. The top of the roof 12 is slanted permitting a photovoltaic panel 28 to be mounted thereon as illustrated in FIG. 2. Stairs 16 lead from the elevated doorway 10 down into the growing area. The mechanical and electrical hardware can then be placed under the stairs conserving valuable growing or storage area.

Figure 3:
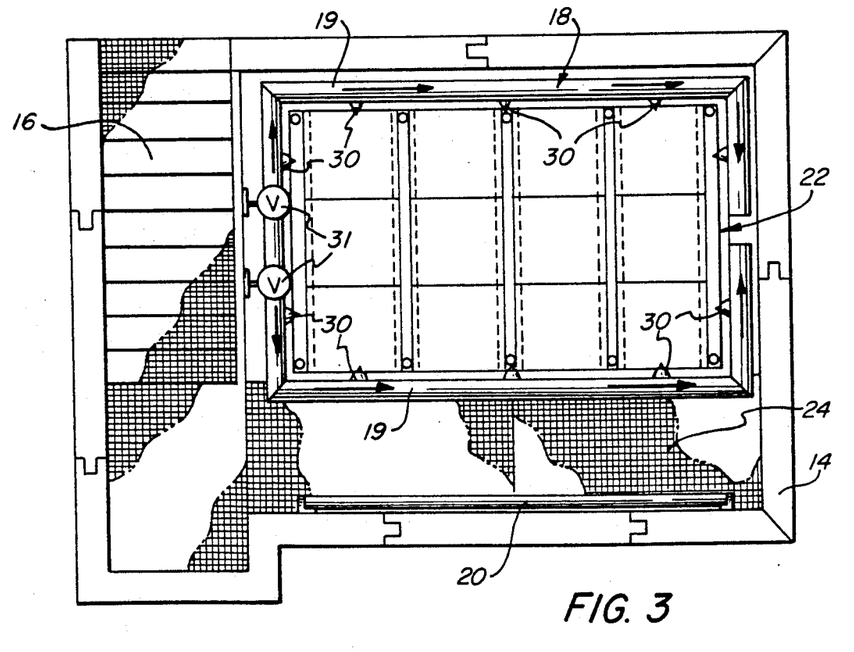
FIG. 3 is a floor plan of one embodiment of the invention.

FIG. 2 and 3 illustrates the interior portion of the growth chamber. At the bottom of the chamber is a grating cover 24 covering an algae tank 26. The algae tank 26 contributes to the high efficiency of the growth chamber by making every possible area of the growth chamber productive. A bubbler is placed inside the algae tank for re-circulating and aerating the water. A growing area is formed by stacked trays 22. The trays 22 are made from molded plastic having raised centers so that excess water drips from the edges thereof so as not to drip onto the plants in the lower trays. The bottom of the trays 22 are also made of a fine mesh having a growth gel medium therein. Seeds are then placed in the gel medium which promotes growth.

Broad spectrum lights 20 are placed on the south wall of the chamber. The lights 20 provide a broad spectrum of light simulating natural light. This results in better and healthier plant growth. One such light source is the KIVA light manufactured by K.I.V.A., Inc., 912

Broadway NE, Albuquerque, N. Mex., 07102. The KIVA light has been found to be exceptionally beneficial to plant growth. The KIVA light also aids in purifying the water in the re-circulation irrigation system. The lights 20 are placed on the south wall to provide maximum light travel as well as to isolate the lights 20 from th misting irrigation nozzles. This placement has the additional benefit of reflecting light off the water droplets and onto the plants during misting. Additionally, with the lights positioned on the south wall this allows plant growth and root direction to follow the earth's magnetic field. Of course in the southern hemisphere this would be reversed.

Irrigation is provided by irrigation tubing or pipes 19 placed over and around the stack of trays 22 in several levels. The irrigation pipes 19 have nozzles 30 spaced along their length. The nozzles 30 are positioned to provide a fine mist of nutrient enriched water over the trays 22. The configuration of the irrigation system provides an even mist over all the trays 22 containing the plant growth. The excess irrigation water is re-circulated by a pump. The pump can be positioned under the stairway to save valuable growing area. A three way valve is used to divert water either to the re-circulating tank, a waste tank, or to add fresh water from a reserve tank if needed. The valve can be either manually or automatically controlled by appropriate electronic controls. Before being re-circulated the irrigation water is filtered. This eliminates and traps any foreign material from clogging the nozzles 30 as well as helping to keep the irrigation water clean.

Additionally, before being re-circulated the irrigation water can be bubbled and sprayed into the air while being exposed to light. This aerate and purifies the water preventing the water from becoming stagnant.

The irrigation system can also be controlled to provide different quantities of spray to be supplied to the different horizontal levels of spray nozzles 30. This permits the control of the quantity of water being supplied at each level. Typically, a larger quantity of water is emitted from the higher nozzles 30 than from the lower ones. This provides more efficient irrigation cycle times and more evenly distributed irrigation and moisture due to the movement downward of the excess moisture from the higher irrigation levels. The irrigation system 18 has a configuration so that either end of the chamber or unit can be expanded. As seen in FIG. 3 the tubes or pipes 19 extend around the perimeter of the chamber or unit. The direction of water flow within the pipes or tubes 19 is indicated by the arrows. The water flow is split so as to flow in two directions around the perimeter of the growing area within the chamber or unit. Water flows in each direction only around half of the perimeter of the growth area. Water flow is terminated at the end of each of the two directions. Valves 31 control the flow of the water in either direction. In this way, when the unit is to be expended panels 14 can be added to the end of the unit and the additional plumbing for the irrigation more easily installed than if the irrigation system 18 consisted of a single loop around the entire perimeter of the growth area.

The slanted stairway roof illustrated in FIG. 2 supports a photovoltaic solar panel. The electricity generated is stored in a bank of batteries located under the stairs. The batteries are capable of storing sufficient energy to power the growth chamber for at least 72 hours. The photovoltaic solar electrical system is capable of providing all the power to run the lighting, irrigation, and other optional electrical equipment, such as a music system. Therefore, external electrical power need not be provided which is advantageous, and necessary in remote locations.

A timer connected to the electrical equipment provides automated control of the growing chamber. This permits a cycle to be used optimizing growth. The lights, as well as the irrigation system can be cycled on and off promoting the most rapid plant growth for a particular variety of plant. The timer and all electrical controls relating thereto can be placed within the growth chamber in a sealed container. This protects the controls from the high humidity maintained in the growth chamber.

The trays 22 are stacked in an array as illustrated in FIGS. 2 and 3. The trays 22 are stacked on a rack system. Within each tray is placed a specially formulated nutrient gel. The nutrient gel is placed on a biodegradable mat. The active ingredients are time released to work on contact with water. The nutrient can be used with vermiculite to extend the period of time it will remain active. The biodegradable mat will dissolve before the nutrient is completely absorbed by the plants. The specially formulated nutrient is composed of a natural ingredient from soil found only in New Mexico. It is a specially formulated nutrient with a rich earth laden mineral base. It contains 20% phosphorous, 30% potash, 20% nitrogen, 10% calcium material, and the balance inactive ingredients. When used without soil it stimulates rapid growth. It will support a one and one half to three inch root growth on grass plants or hair root plants. The nutrient has an organic base that keeps phosphates available and keeps alkaline water from interfering with long term phosphate uptake. Additionally, it stimulates bacterial activity and provides direct assimilation of calcium for plant growth.

Figure 4:
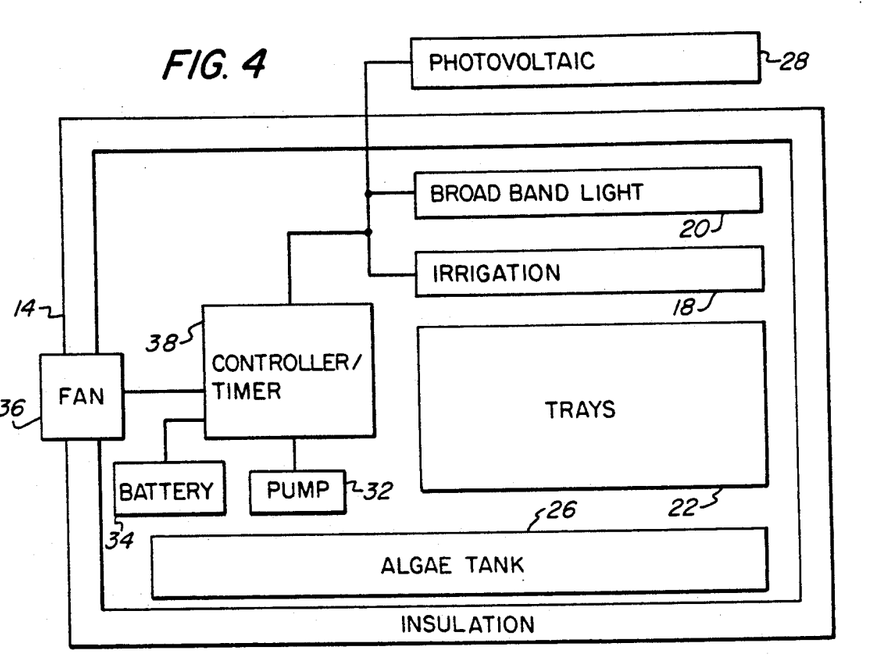
FIG. 4 is a block diagram illustrating the invention.

In FIG. 4, a block diagram, the relationship and combination of the invention can be better appreciated. Each labeled box represents an element of the invention. In referring to each box the name and reference number of the element is used so that the same number will represent the same element in each figure of the drawings. Therefore, the box representing the photovoltaic panel is labeled 28 and will be referred to as photovoltaic panel 28.

Photovoltaic panel 28 supplies power to the controller and timer 38. The controller and timer 38 in turn distributes the power to light 20, irrigation system 18, pump 32, optional fan 36, and battery 34. The controller and timer 38 both controls the distribution of power to the other elements as well as the timing of their on and off cycles. The controller and timer 38 also regulates the power to and from the storage battery 34. During periods of surplus power generation from photovoltaic panel 28 the controller and timer 38 will divert power to charge storage battery 34. Conversely, during times of insufficient power generation from photovoltaic panel 28 the controller and timer 38 will use the energy stored in the battery 34 to supply power to the elements requiring power. Each electrical element of the growth chamber is selected to provide very efficient operation to conserve power. In this way the entire growth chamber can be totally self contained. This permits operation in remote areas where no electrical power is available, or where it is too expensive to be of practical use.

The controller and timer 38 also controls the on and off cycling of the electrical equipment. For example, the controller and timer 38 will periodically energize pump 32 to bubble the algae tank 26. Also, when necessary fan 36 will be energized to exhaust any excess heat or humidity that may accumulate within the growth chamber. The fan 36 is positioned at a convenient location through one of the modular insulated panels 14. The controller and timer 38 also controls the cycling of the light 20 and irrigation system 18. This is perhaps its most important function. For this directly controls the efficient growth of the plants placed on trays 22.

One method of growing that has proven to obtain superior results is to expose the fresh water to the broad spectrum KIVA light for 72 hours to biologically purify the water prior to being used. The trays are than filled with the nutrient growth gel and seeded. The lighting is then cycled on and off for predetermined periods. The seeds are irrigated four to six times a day for approximately seven to fourteen minutes each time. The lights can be cycled on at the same time as the irrigation so that the light can beneficially react with the water to purify it. This greatly helps to eliminate harmful mildew and other disadvantages organisms. Also, subliminal music can be played for up to eighteen hours per day to encourage plant growth. The trays are rotated to provide a range of growth stages so that all plants do not mature at the same time. This provides consistent harvests spaced throughout the growing period.

The timer can also be set for the following stages:
STAGE I
Lights-tape player. Timing set adjustments, 24 hours, 1 hour intervals.
STAGE II
Internal irrigation pump with pump starter. Timing set adjustment, 6 hours, 1 minute intervals.
STAGE III
Exterior pump with pump starter. Timing set 24 hours with flat cut-off switch and override switch from Stage II and control setting capable of setting for sunlight hours when connected to photovoltaic system.
STAGE IV
Thermostat adjustable temperature for exhaust fan and air conditioner control-heater.
STAGE V
Circulator pump. 1 hour cycle adjustable on 10 minute interval with off switch when Stage II is operating.

Figure 5:
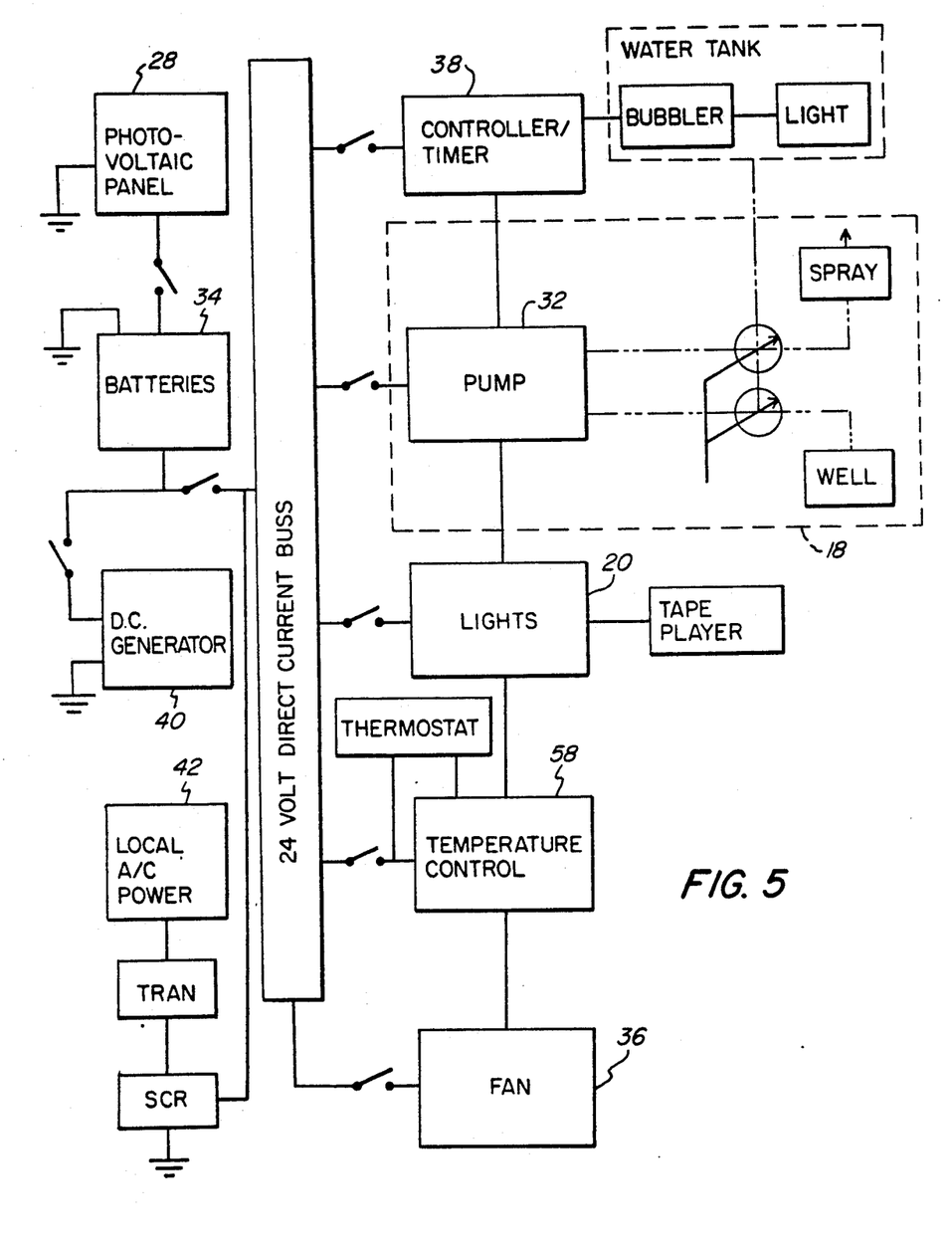
FIG. 5 is a block diagram illustrating the electrical connections used for the invention.

FIG. 5 illustrates the alternative power sources and their electrical connections that can be used. The blocks 28, 34, 40, and 42 represent the various selectable alternative power sources available. A photovoltaic panel array 28 can be selected to power the unit when normal sunlight is available. A D.C. storage battery system 34 can be used when sufficient sunlight is not available to power the unit. The battery system 34 is comprised of ten lead-acid twelve volt batteries connected in a two by five array to store sufficient twenty-four volt power to last approximately three days. A D.C. generator 40 can be used to supplement or provide additional power as well as to charge the battery system 34 when normal sunlight is not available for extended periods of time. Local A.C. power 42 can also be stepped down to approximately twenty-four volts and rectified to provide power to the unit or to charge the battery system 34. These alternative power sources are selectively connected to a D.C. bus 56 which in turn powers the various electrical elements of the unit. For example, controller/timer 38, pump 32, lights 20, temperature control 58, and fan 36.

Figure 6:
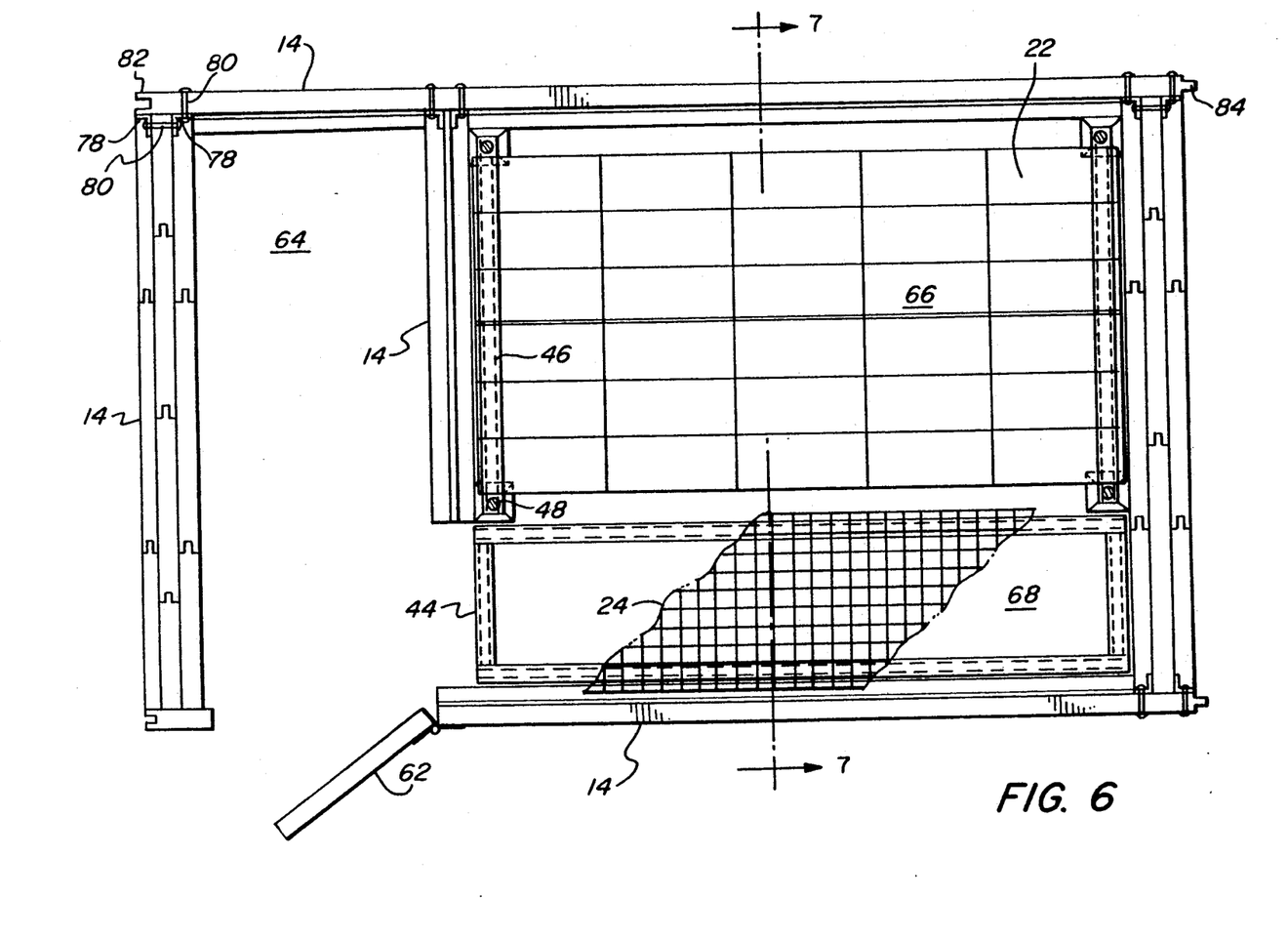
FIG. 6 a plan view of another embodiment of the invention.
Figure 7:
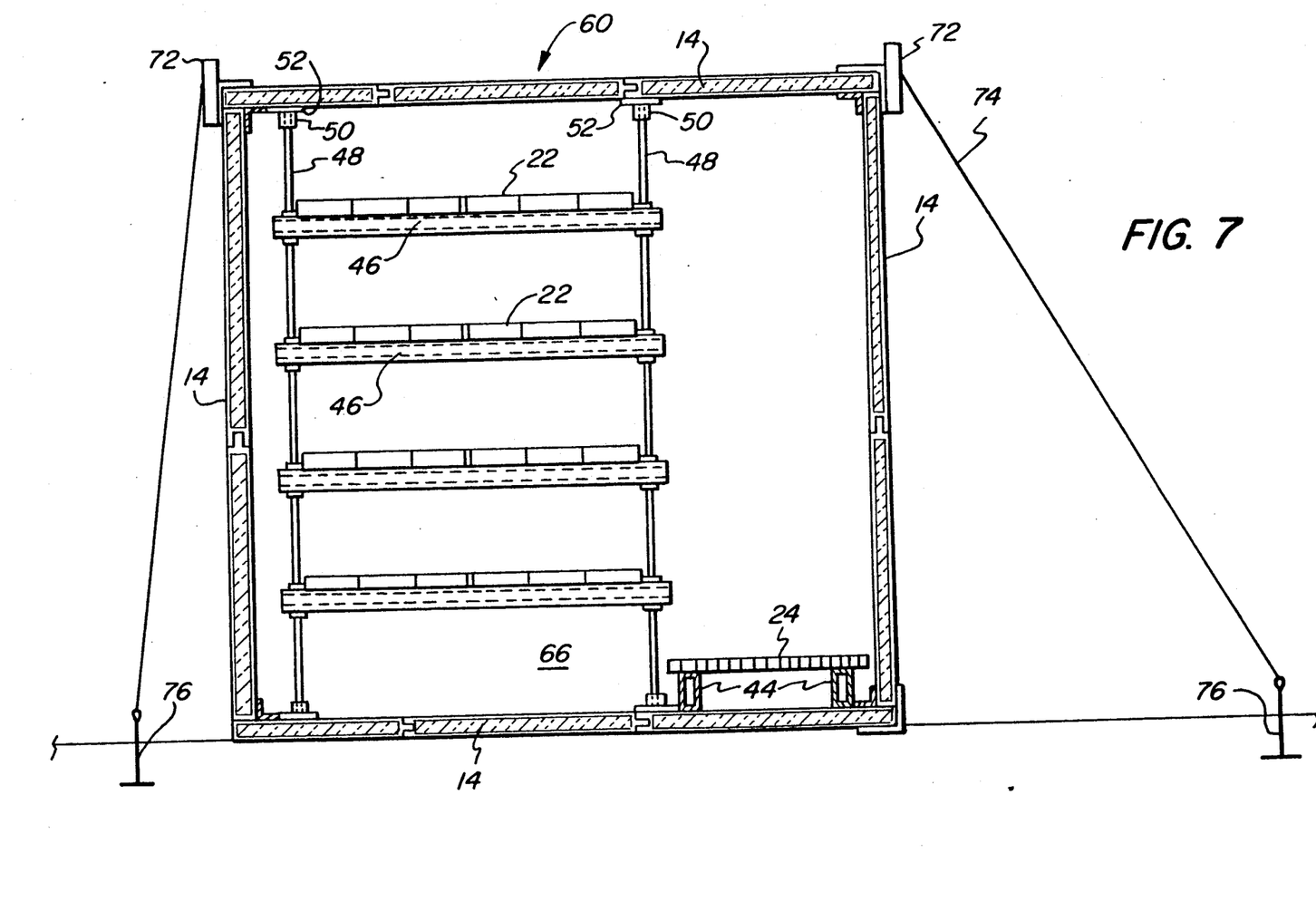
FIG. 7 is a cross sectional view of FIG. 6. taken along line 7—7.
Figure 8:
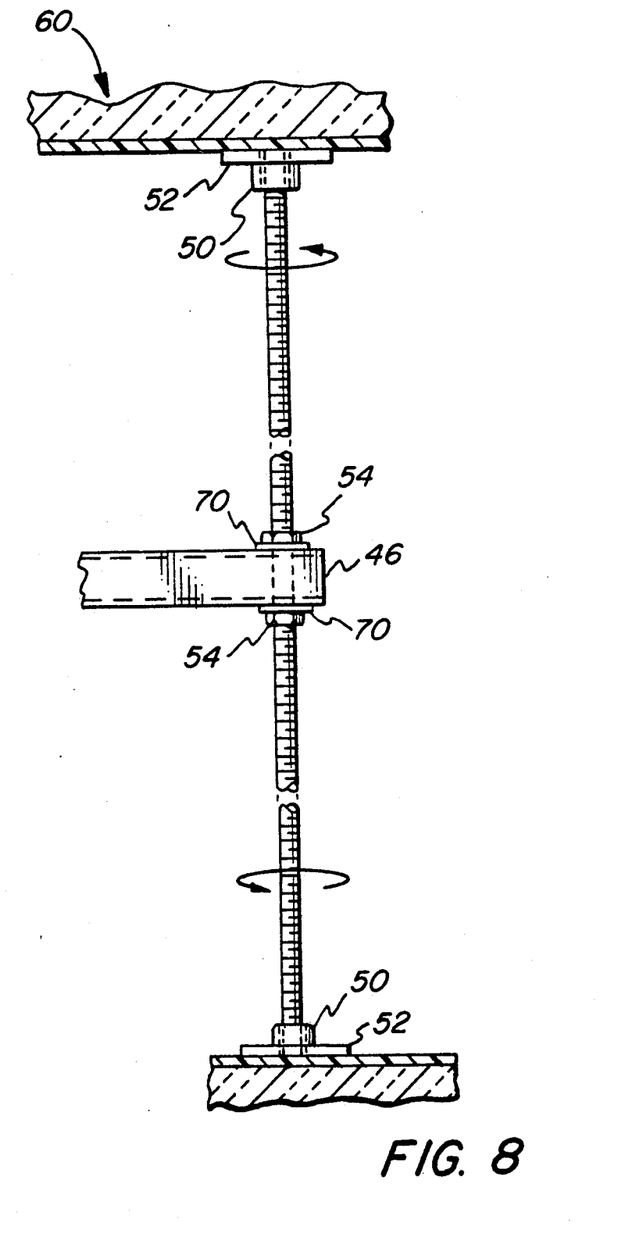
FIG. 8 is a more detailed illustration of the rack support system.

Another embodiment is illustrated in FIGS. 6-8. This embodiment is of a simpler rectangular construction. As illustrated in FIG. 6 the modular or sectioned panels 14 are positioned in a rectangle. As can be seen in FIG. 6, the panels 14 can be doubled or even tripled to provide additional rigidity or insulation. Brackets 78 are L-shaped and are used to secure the panels 14 together. Through bolts 80 are used to secure the brackets 78 to the panels 14. When attaching a male end 84 of a panel 14 the female end 82 on the end of a panel 14 can be cut off and used as a spacer between the female end of a panel 14 and the pair of brackets 78 used to attach the panels at right angles. The through bolts 80 can then be securely fastened without deformation which would result if the brackets 78 were tightened down on the uneven surface of the male end 84 of a panel 14.

The roof panel comprising the flat roof 60 can have incorporated therein a structural member for lifting the unit into position or for strapping the unit down once assembled to maintain stability in high winds. The unit is entered by door 62. The unit is sectioned into three different areas, storage area 64, growth area 66, and work area 68. The storage area 64 can also house the various electrical and mechanical systems needed to provide an optimum growth enviroment. The growth area 66 is the largest area and is comprised of shelving or trays 22 on which seeds and plants are placed. The work area 68 is comprised of an elevated grating 24 placed over structural fiberglass grating supports 44. The grating supports are manufactured by a pultrusion process. In this process fiberglass reinforcements are pulled through a bath of thermosetting resin and then placed into a heated forming and curing die to produce composite structural shapes. This results in an extremely strong corrosion resistant lightweight structural member ideal for the warm humid environment of the growth chamber unit. The shelf or tray supports 46 are also made of structural fiberglass.

The construction of this embodiment is more clearly illustrated in FIG. 7. The rectangular enclosure comprised of modular fiberglass coated insulated panels 14 contains the storage 64, growth 66, and work 68 areas. The entire unit, if assembled above ground, can be secured to the ground by bracket 72, tie down or rope 74, and anchors 76. When tied down, the lightweight unit can sustain high winds without damage. The growth area 66 is comprised of fiberglass structural shelf supports 46 attached to threaded bars 48. The threaded bars 48 extend from the floor to flat roof 60. The threaded bars 48 are attached to the floor and flat roof 60 by threaded collar 50 and flange 52. The flange 52 acts to distribute the load over a larger surface area of the panels 14. On each shelf or tray support 46 a shelf or tray 22 is placed. The threaded bars 48 permit secure placement as well as great flexibility in the positioning of the shelves or trays 22. The shelves or trays 22 can be positioned at any level on threaded bars 48.

FIG. 8 better illustrates the adjustable shelving. As can be seen in FIG. 8, the shelf or tray support 46 is placed through the threaded bar 48. The support 46 is then adjusted and held by adjustable shelf or tray nuts 54. The nut flange 70 is used to distribute the load. The nuts 54 can then be rotated to place the supports 46 and the shelves or trays 22 into any desired position. The nuts 54 can then be tightened to securely hold the support 46 in position. This results in a very rigid structure greatly increasing the structural strength of the unit as a whole once assembled.

The unit described above relating to FIGS. 6-8 can also incorporate the various electrical and mechanical systems described in any of the other embodiments also described in this disclosure.

The growth chambers described above have proven to provide organically pure and enhanced plant growth. The growth rate and nutrient content of the plants are greatly enhanced with the growth chambers. Additionally, scarce water and land is optimally utilized providing very efficient production. This greatly increased the yield with reduced cost over conventional growing methods. The growing chambers and systems described becomes increasingly important with the expanding concern over the origin and handling of the plants consumed by humans and animals.

While the invention has been described with respect to several embodiments, it will be understood and appreciated that variations and modifications may be made without departing from the scope and spirit of the invention.

What is claimed is:

1. A modular efficient horticultural growth chamber comprising:
   a sectioned water tight floor;
   sectioned water tight sides extending up from said floor forming a chamber;
   an elevated frame having a doorway therein;
   stairs leading from said doorway down into said chamber;
   an algae tank placed on said floor;
   an elevated platform positioned over said algae tank;
   trays stacked on said platform having spaces there between;
   irrigation system means for providing a fine mist of water to horticultural material placed on said trays;
   illumination system means for providing a broad spectrum of light to horticultural material placed on said trays;
   controller and timer means, associated with said irrigation system and illumination system, for controlling and timing a sequence of irrigation and illumination periods;
   a roof attached to said sides covering said floor, the portion of said roof over said stairs being angled; and
   a photovoltaic panel, connected to said controller and timer means, positioned on the portion of said roof over said stairs.

2. A modular efficient horticultural growth chamber as in claim 1 wherein:
   said floor and sides are insulated.

3. A modular efficient horticultural growth chamber as in claim 2 further comprising:
   a battery for storing excess energy generated from said photovoltaic panel.

4. A modular efficient horticultural growth chamber as in claim 3 further comprising:
   a biodegradable mesh placed in said trays; and
   a nutrient gel coating said biodegradable mesh.

5. A modular efficient horticultural growth chamber as in claim 4 wherein:
   said nutrient gel comprises a mixture of approximately 20% phosphorous, 30% potash, 20% nitrogen, 10% calcium material, and the balance inactive ingredients.

6. A modular efficient horticultural growth chamber as in claim 5 wherein:
   trays are raised in the middle thereof and have drip channels extending to the corners whereby water is prevented from dripping on the lower positioned trays.

7. A modular efficient horticultural growth chamber or unit comprising:
   a plurality of insulated fiberglass panels forming an air tight and water tight rectangular unit capable of being expanded in any direction;
   a door opening into said unit attached to one of said plurality of insulated panels;
   a storage area partitioned within the unit;
   a growing area within the unit separated from said storage area by at least one of said plurality of insulated panels;
   a working area within the unit having at least one side adjacent said growing area;
   supports positioned on the floor of said working area made of a noncorrosive material;
   a non-corrosive grate placed over said supports forming a platform;
   a plurality of threaded rods vertically positioned between the floor and roof of the unit spaced within said growing area;
   a plurality of flanges attached to the floor and roof adapted to receive said threaded rods whereby said rods a securely held in place;
   a plurality of noncorrosive shelf supports having holes therein adapted to receive said threaded rods, each of said plurality of shelf supports being supported by a group of said plurality of rods;
   a plurality of pairs of locknuts threaded onto said plurality of threaded bars each said plurality of pairs of locknuts having one end of said plurality of shelf supports positioned there between whereby any desired elevation or spacing can be selected for said plurality of shelf supports and each said plurality of shelf supports can be locked into place; and
   a plurality of shelves placed on said plurality of shelf supports.

8. A modular efficient horticultural growth chamber or unit as in claim 7 further comprising:
   irrigation means, placed within said unit, for irrigating plants and seeds;
   light means, placed within said unit, for lighting plants and seeds with a broad spectrum of light;
   ventilation means, placed in an opening within one of said plurality of panels, for ventilating the unit;
   controller means, associated with said irrigation, light, and ventilation means, for controlling the on and off cycling of said irrigation, light, and ventilation means;
   a photovoltaic panel connected to said controller means; and
   a storage battery connected to said photovoltaic panel and said controller means.

9. A modular efficient horticultural growth chamber or unit comprising:
   a plurality of insulated fiberglass panels doubled in thickness having tongue and groove ends adapted to fit together forming an air tight and water tight rectangular unit capable of being expanded at either end thereof;
   a door opening into said unit attached to one of said plurality of insulated panels;
   a plurality of brackets attached to the roof of said rectangular unit capable of supporting the entire weight of the unit whereby the unit can be lifted into position after being assembled if desired;

a cable placed through said plurality of brackets and anchored whereby the unit is secured into position after assembly and placement;

a storage area partitioned within the unit;

a growing area within the unit separated from said storage area by at least one of said plurality of insulated panels;

a working area within the unit having at least one side adjacent said growing area;

supports positioned on the floor of said working area made of a noncorrosive material;

a noncorrosive grate placed over said supports forming a platform;

a plurality of threaded rods vertically positioned between the floor and roof of the unit spaced within said growing area;

a plurality of flanges attached to the floor and roof adapted to receive said threaded rods whereby said rods a securely held in place;

a plurality of noncorrosive shelf supports having holes therein adapted to receive said threaded rods, each of said plurality of shelf supports being supported by a group of said plurality of rods;

a plurality of pairs of locknuts threaded onto said plurality of threaded bars each said plurality of pairs of locknuts having one end of said plurality of shelf supports positioned there between whereby any desired elevation or spacing can be selected for said plurality of shelf supports and each said plurality of shelf supports can be locked into place;

a plurality of shelves placed on said plurality of shelf supports;

a plurality of irrigation pipes positioned horizontally in multiple vertical levels around a portion of the perimeter of said growth area, said plurality of irrigation pipes at each level being divided into two branches each of said branches terminating at one end whereby the ends of the unit can easily be expanded and the plurality of irrigation pipes easily installed into the expanded portion;

a first valve controlling the flow of water in one of said two branches;

a second valve controlling the flow of water in the other one of said two branches;

flow means, associated with each of said multiple vertical levels of said plurality of irrigation pipes, for variably controlling the flow at each of said multiple vertical levels whereby the flow in the lower levels can be reduced providing more even moisture distribution due to the nonabsorbability of all the irrigation water at the higher levels and the drifting downward of the excess water;

a light source having a broad spectrum positioned on the south wall, when the unit is positioned and secured in place, facing the growth area;

a tank adapted to collect the excess irrigation water and positioned in the path of light from said light source;

a pump attached to said plurality of irrigation pipes and said tank;

an aerator attached to said tank and pump whereby the water is aerated while being exposed to said light source which purifies the water;

a ventilation fan placed to direct air within the unit to the outside;

a music player positioned to play music within the growth and work area;

a photovoltaic panel positioned outside of the unit;

a storage battery connected to said photovoltaic panel; and a controller means, attached to said pump, light source, ventilation fan, music player, photovoltaic panel, and storage battery, for timing and controlling the on and off cycling of said pump, light source, ventilation fan, and music player and the current flow between said photovoltaic panel and storage battery.

* * * * *